United States Patent

[11] 3,609,467

| [72] | Inventor | James H. Curtis<br>Columbia, S.C. |
|---|---|---|
| [21] | Appl. No. | 29,509 |
| [22] | Filed | Apr. 17, 1970 |
| [45] | Patented | Sept. 28, 1971 |
| [73] | Assignee | General Electric Company |

[54] ELECTROLYTIC CAPACITOR AND ELECTROLYTE MATERIAL THEREFOR
16 Claims, 2 Drawing Figs.

[52] U.S. Cl. .................................................. 317/230, 252/62.2
[51] Int. Cl. ................................................. H01g 9/02
[50] Field of Search ...................................... 317/230, 231, 233; 252/62.2

[56] References Cited
UNITED STATES PATENTS

| 2,071,103 | 2/1937 | Bergstein........................ | 317/230 |
|---|---|---|---|
| 2,149,086 | 2/1939 | Craine............................ | 317/230 |
| 2,934,682 | 4/1960 | Schwarz et al................. | 317/230 |
| 2,944,026 | 7/1960 | Robinson ...................... | 252/62.2 |
| 2,945,164 | 7/1960 | Taylor........................... | 317/230 |
| 3,547,423 | 12/1970 | Jenny............................ | 317/230 |

FOREIGN PATENTS

| 448,830 | 6/1936 | Great Britain................. | 317/230 |
|---|---|---|---|
| 1,034,754 | 7/1966 | Great Britain................. | 317/230 |

Primary Examiner—James D. Kallam
Attorneys—Nathan J. Cornfeld, Frank L. Neuhauser, Oscar B. Waddell, Joseph B. Forman and John P. Taylor ABSTRACT: A substantially nonaqueous liquid electrolyte for electrolytic capacitors consisting essentially of a major proportion of a solvent such as ethylene glycol, a minor proportion of an ionogen which is the reaction product ester of an organic base and of an acid such as a mono-, di-, or tri-basic organic acid, or the hydroxy substituted derivatives of these acids, the ionogen preferably being dimethylethanolamine adipate (DMEA), and a small but effective amount of an alkanolamine phosphate. The concentration of the ester in the electrolyte can be from about 0.1%–25% by weight. The concentration of the alkanolamine phosphate may be about 0.1%–6.0% by weight. The electrolyte exhibits a low vapor pressure and enhanced chemical and electrical stability at elevated temperatures, and is characterized by a high breakdown voltage and long life electrical stability.

PATENTED SEP 28 1971 3,609,467

INVENTOR.
JAMES H. CURTIS
BY
ATTORNEY

ELECTROLYTIC CAPACITOR AND ELECTROLYTE MATERIAL THEREFOR

BACKGROUND OF THE INVENTION

1. Field of the Invention

The present invention relates to electrolytic capacitors, and more particularly to an improved electrolyte therefor.

2. Description of the Prior Art

Conventional electrolytic capacitors for effective operation up to about 100° C. utilizing an electrolyte consisting predominantly of ethylene glycol and a conducting ionogen are well known. In order to make these capacitors more effective, it has been found desirable to increase the breakdown or scintillation voltage thereof, and to increase the thermal stability of the electrolyte. This has been heretofore accomplished, for example, by the addition of mannitol, a polyhydric alcohol having the formula $CH_2OH(CHOH)_4CH_2OH$, to the electrolyte. However, mannitol has several disadvantages which detract from its effectiveness as an additive. A primary disadvantage of mannitol is the requirement of an considerably quantity of this material to increase the breakdown voltage of the electrolyte and to significantly affect its viscosity. The addition of such large quantities increases the resistivity of the electrolyte and results in a degradation of the electrical properties, for example the dissipation factor, of the capacitors.

In copending application Ser. No. 696,896, now issued as U.S. Pat. No. 3,509,425 of Jenny and Curtis, assigned to the assignee of the present invention, there is disclosed a copolymer of maleic anhydride and methyl vinyl ether, sold under the trademark Gantrez by General Aniline and Film Corp. and which gives improved performance as compared to mannitol. The present invention discloses a further improved electrolyte of low cost and more easily soluble ingredients.

The ionogen employed in conventional capacitor electrolytes is typically a borate such as ammonium pentaborate or ammonium biborate or other substituted ammonium salts such as ammonium acetate and ammonium tartrate. For extended temperature devices, the conventional glycol solvent may be replaced by a highly polar, nonaqueous solvent but the same conducting species is generally retained.

A major drawback of these conventional electrolytes is their high vapor pressure at elevated temperatures, i.e., at about 125° C. or higher. This causes thermal instability and results in capacitors having unstable electrical properties. Additionally, the high vapor pressures increase electrolyte leakage through the capacitor seals. When utilized in electrolyte capacitors having aluminum electrodes, the ammonia which is present in the vapor promotes chemical instability, pH reduction and resulting corrosion of the aluminum anode and cathode.

SUMMARY OF THE INVENTION

It is therefore an object of the present invention to provide an electrolyte which exhibits a low vapor pressure and enhanced chemical stability at elevated temperatures.

It is another object of this invention to provide an electrolytic capacitor having stable electrical properties at elevated temperatures and increased reliability over prolonged periods of time by virtue of the chemical stability and low vapor pressure of the electrolyte contained therein.

Another object of the invention is to provide an electrolyte for an electrolytic capacitor which capacitor will have a minimum possibility of hydrogen gas generation by virtue of the presence of a minimum amount of water in the electrolyte.

Another object of the invention is to provide an improved electrolyte having a substantially increased breakdown or scintillation voltage while at the same time exhibiting relatively low resistivity.

Still another object of this invention is to provide an improved electrolyte containing an additive, wherein the additive minimizes a degradation in the electrical properties of the electrolyte.

It is still a further object of this invention to provide an improved electrolytic capacitor including a predominantly ethylene glycol electrolyte which includes small amounts of an alkanolamine phosphate additive to increase the breakdown voltage thereof while not adversely affecting the electrical characteristics of the capacitor.

Other objects and advantages will become apparent from the following description and appended claims.

In accordance with the objects of this invention, the disadvantage of conventional electrolytes are minimized or overcome by providing a substantially nonaqueous liquid electrolyte for electrolytic capacitors, which includes a major proportion of a solvent, for example ethylene glycol, and a minor proportion of an ionogen wherein the ionogen is a thermally stable conductive ester synthesized from an organic base and an organic acid, the ionogen being present in minimal but significant concentrations of from about 0.01 percent by weight to as much as about 25.0 percent by weight, and a small but measurably effective amount of an alkanolamine phosphate. The alkanolamine phosphate may be present in various concentrations from about 0.1 percent by weight up to the limit of solubility of the alkanolamine phosphate in the solvent. A preferred concentration is from about 0.1 percent to 6.0 percent by weight. An embodiment of the present invention comprises an electrolytic capacitor including the ethylene glycol electrolyte containing the alkanolamine phosphate additive.

BRIEF DESCRIPTION OF THE DRAWINGS

The invention will be better understood from the following description taken in conjunction with the accompanying drawings.

DESCRIPTION OF THE PREFERRED EMBODIMENTS

Figure 1:
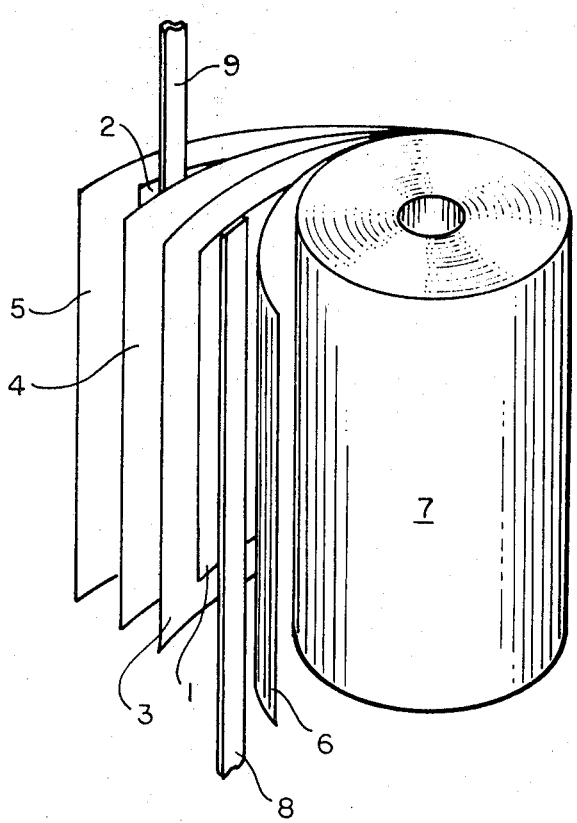
FIG. 1 illustrates a wound electrolytic capacitor section to which the present invention is applicable.

Referring now to the drawings, and in particular to FIG. 1, there is shown a partially unrolled capacitor roll section of conventional construction comprising a pair of electrode foils 1 and 2, at least one of which is made of tantalum, aluminum, or other suitably film-forming metal which may be advantageously, although not necessarily, etched, and which has a dielectric oxide film thereon. The foils, in the operation of the capacitor, have opposite polarity. The dielectric oxide film may be produced by film-forming (usually anodizing) processes well known in the electrolytic capacitor art. In a polar type capacitor, only one of the electrode foils (anodes) will have an anodic dielectric oxide film thereon. In a nonpolar capacitor, both electrode foils will have such films thereon. Between foils 1 and 2 are one or more sheets of dielectric spacer material 3, 4, 5, and 6 which may be composed, for example, of cellulosic material, including paper made of vegetable fiber, such as Benares Hemp, or other suitable material of permeable, porous or impregnatable nature. These sheets are impregnated with the electrolyte of the present invention. Terminals or tap straps 8 or 9 are secured to the respective electrode foils and extend in the same or opposite directions. The electrode foils and dielectric sheets are wound into a compact roll 7 prior to insertion into the casing 10, as shown in FIG. 2.

Figure 2:
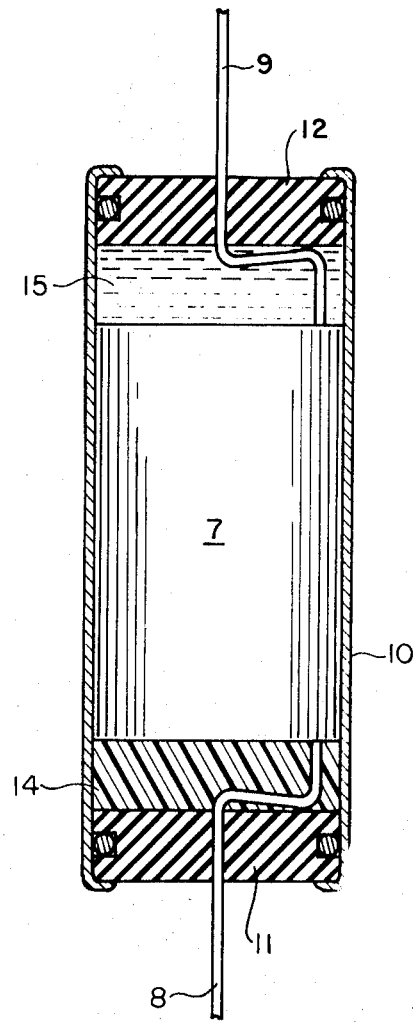
FIG. 2 illustrates a capacitor assembly with the capacitor section of FIG. 1 enclosed in a casing.

FIG. 2 shows the capacitor roll 7 enclosed in a metal casing with terminals 8 and 9 extending respectively through insulating plugs or discs 11 and 12 which seal the interior of the casing in a fluidtight manner. The roll 7 may be secured or positioned in the casing 10 by a suitable potting compound 14 in the bottom of the casing. The compound 14 may be a resin which is nonreactive with and insoluble in the electrolyte 15 of the present invention. Alternatively, other mechanical techniques well known in the art may be employed to stabilize the position of the roll. The fill electrolyte 15, as more fully described hereinafter, may fill casing 10.

Other types of electrolytic capacitors may also employ the electrolyte of the present invention. For example, instead of the arrangement shown in FIGS. 1 and 2, wherein the roll is formed by wound cathode and anode foils, the capacitor roll may be constituted by only one electrode foil (anode) having a dielectric film thereon, the cathode being constituted by the outer casing. In such arrangement, the casing is typically made of silver. Another well known type of capacitor which may employ the electrolyte of the present invention is the wire capacitor, wherein the anode is a film forming wire having a dielectric oxide formed thereon.

The basic electrolyte of the present invention is preferably composed principally of a mixture of a major proportion of ethylene glycol as the solvent and a minor proportion of an ionogen. The ionogen is preferably dimethylethanolamine adipate (DMEA), but other conducting esters of organic salts and organic bases, such as alkanolamine adipates, alkanolamine fumarates, and malonates, or their equivalents may also be employed. Examples of ionogens which can be used in the electrolyte of the present invention include, for example, those disclosed and claimed in copending application Ser. No. 720,805 (now U.S. Pat. No. 3,547,423) assigned to the assignee of this invention. The proportion of the constituents in the basic electrolyte is preferably about 84.8 percent ethylene glycol and about 15.0 percent DMEA and 0.2 percent triethanolamine phosphate (TEAP) by weight.

It has been found that the addition of an alkanolamine phosphate to the basic electrolyte significantly increases the breakdown voltage and electrical properties thereof, as more fully explained in the examples given below.

| Example No. | Additive Type | Percent by wt. | Breakdown (i.e. scintillation) voltage (V. D.C.) |
|---|---|---|---|
| I | | 0.0 | 150 |
| II | TEAP | 0.1 | 225 |
| III | TEAP | 0.2 | 275 |
| IV | TEAP | 0.5 | 285 |
| V | TEAP | 6.0 | 285 |
| VI | DEAP | 0.2 | 250 |

NOTE.—Base electrolyte (all examples), percent by weight: 84.8% ethylene glycol; 15.0% dimethylethanolamine adipate.

The alkanolamine phosphates, triethanolamine phosphate (TEAP), and diethanolamine phosphate (DEAP) are prepared by reacting equal weights of alkanolamine and phosphoric acid at 150° C. for about 1 to 3 hours.

It is obvious to those skilled in the art that various other molecular ratios rather than equal weights of phosphoric acid and alkanolamine may be made, and other alkanolamine phosphates may be produced, without departing from the spirit of this invention.

The alkanolamine phosphate is useful when added in concentrations of from a very small but significant amount, about 0.1 percent by weight, up to the limit of its solubility in ethylene glycol or other solvents (which solubility is dependent upon temperature and solvent concentration). A preferred concentration range is from about 0.1–6.0 percent by weight of the electrolyte and a particularly preferred concentration is 0.2 percent.

The basic electrolyte containing the alkanolamine phosphate is substantially nonaqueous liquid. The minor amount of water which is present is derived mostly from the water of condensation of the ionogen. The preferred viscosity of the electrolyte is about 40–50 times less fluid than water.

In another, secondary embodiment of the invention, the same basic electrolyte disclosed above, with the additives, may advantageously be utilized in extended temperature applications (−40° to 125° C.) because of the low vapor pressure and high boiling point of the novel electrolyte.

In a further embodiment of the invention, the same improved electrolyte may advantageously be utilized where hydrogen gas generation at the cathode would be detrimental, occurring as a result of electrolysis of water.

The composition proportions of the basic electrolyte is not particularly critical and may vary within fairly broad limits. The maximum ethylene glycol or other solvent concentration is determined by resistivity considerations, and the concentration should not exceed about 95 percent by weight of total electrolyte. An electrolyte containing more than about 95 percent by weight of solvent would most likely have a resistivity of such high value as to limit its practical usefulness. The lower limit of ethylene glycol concentration is determined by the solubility limit of the ionogen in the solvent at the lowest operating temperature of the capacitor, but should not be less than about 50 percent by weight of the basic electrolyte.

Examples I–VI show the effect of the addition of small amounts of different alkanolamine phosphates of the present invention to a 84.8 percent ethylene glycol/15.0 percent dimethylethanolamine adipate electrolyte.

By comparison, Table I below shows the effect of the addition of varying amounts of mannitol to the same basic electrolyte.

TABLE I

| Base electrolyte | Weight percent mannitol added | Breakdown voltage (V. D.C.) |
|---|---|---|
| 84.8% ethylene glycol; 15.0% dimethylethanolamine adipate (same as in Examples I–VI) | 0 | 150 |
| | 3 | 175 |
| | 6 | 200 |
| | 9 | 200 |

TABLE II

| Base electrolyte | Percent Gantrez No. 119 added | Breakdown voltage (V. D.C.) |
|---|---|---|
| 84.8% ethylene glycol; 15.0% dimethylethanolamine adipate (same as in Examples I–VI) | 0 | 150 |
| | 0.2 | 170 |
| | 0.5 | 195 |
| | 1.0 | 225 |

The foregoing Tables and Examples clearly show that a very small amount of TEAP produces a substantial increase in scintillation (breakdown) voltage, as much as three times the equivalent weight percent of mannitol.

Furthermore, comparing Table II with Examples I–V shows that the copolymer Gantrez increased the scintillation voltage by 80 percent, while the TEAP of the present invention increased the scintillation voltage by 123 percent of that obtained with only the base electrolyte. In addition, a very small amount of the alkanolamine phosphate (TEAP or DEAP) causes a substantial increase in the breakdown voltage, amounting to an improvement of greater than 50 percent of the value thereof, as compared to mannitol or Gantrez.

It has also been found that the beneficial effects observed resulting from the addition of very small amounts of the alkanolamine phosphates are not limited to 84.8 percent ehtylene glycol/15 percent ionogen electrolytes. For example, the addition of only 0.2 percent TEAP of the alkanolamine phosphate to an 85 percent ethylene glycol/10 percent ionogen/5 percent water electrolyte increased the breakdown voltage from 275 V. DC to 410 V. DC, an improvement of better than 45 percent. Further, the alkanolamine phosphate (TEAP) inhibited electrolysis of water at the cathode. See Table III below.

TABLE III

| Base electrolyte | Percent water added | TEAP added, wt. percent | Temp., ° C. | Hydrogen gas generated [1] |
|---|---|---|---|---|
| Same as in Examples I–VI | 0 | 0 | 125 | 0.2 |
| | 10 | 0 | 125 | 30.0 |
| | 1 | 0.2 | 125 | 0.0005 |
| | 5 | 0.2 | 125 | 0.02 |
| | 10 | 0.2 | 125 | 0.03 |

[1] After 1,000 hrs., ml./in.$^2$ at STP.

I have found, unexpectedly, from a comparison of the base electrolytes, one of which contained an addition of mannitol, another containing an addition of TEAP, a third containing an addition of Gantrez 119 copolymer, and a fourth containing DEAP, that the resistivity at 30° C. of the base electrolyte containing the TEAP is about 570 ohm-cm., whereas the mannitol-containing electrolyte has a resistivity of 110 ohm-cm., and that containing the Gantrez copolymer was 700 ohm-cm. Thus, the expected increase in resistivity and attendant degradation of electrical properties does not occur in capacitors containing electrolytes which include the TEAP of the present invention.

The relationship nominally existing between breakdown voltage and resistivity is well known and is expressed according to the equation: B.D. Voltage=$\rho a+b$ where $a$ and $b$ are constants, determined by nature of the solvent and solute, and $\rho$ represents the resistivity (ohm-cm.) of the solution. Since all constituents except the modifying agent, i.e., TEAP, DEAP, mannitol or copolymer (Gantrez) are the same, it would be expected that the lower resistivity electrolyte, i.e., that containing the TEAP, would exhibit the lower breakdown voltage. However, I have found that, unexpectedly, the breakdown voltage is actually higher as shown in examples I–VI and tables I and II, where the breakdown voltage of the electrolyte containing the TEAP is seen to be significantly greater than that containing the mannitol or containing the copolymer.

To further prove the advantages of the novel electrolyte in actual capacitors, life tests were conducted on groups of electrolytic capacitors containing the electrolyte of the present invention, to demonstrate the electrical characteristics thereof and to show its effectiveness in capacitors rated up to about 150 V. DC The capacitors were constructed of an etched aluminum foil anode (upon which a dielectric oxide film was formed by anodizing), dielectric spacer sheets and a cathode foil. The higher the anodizing voltage applied, the thicker the oxide film formed and the higher the rated voltage of the resulting capacitor. Terminals were applied to the respective electrodes, and the cathode, anode and dielectric spacer materials were convolutely wound into a capacitor roll. The wound roll was then impregnated with the electrolyte by any well known technique, for example, centrifuging or vacuum impregnation. The rolls were aged, inserted into the casing and the casings were sealed.

The electrolyte used to impregnate the dielectric spacer material was an ethylene glycol dimethylethanolamine adipate (DMEA), electrolyte containing 0.2 percent by weight of triethanolamine phosphate. It was prepared by adding 0.2 percent TEAP to a base electrolyte consisting essentially of 84.8 percent glycol and 15.0 percent DMEA.

Table IV below shows the electrical characteristics of the electrolytic capacitors prepared for these life tests. The capacitors were rated at 5 V. DC 15 V. DC 30 V. DC 75 V. DC and 150 V. DC respectively:

pected, the leakage current increases with increasing potential difference.

While the present invention has been described with reference to particular embodiments thereof, it will be understood that numerous modifications may be made by those skilled in the art without actually departing from the scope of the invention.

What I claim as new and desire to secure by Letters Patent of the United States is:

1. An electrolyte for electrolytic capacitors comprising a major proportion of a solvent, a minor proportion of an ionogen dissolved therein and an alkanolamine phosphate in said electrolyte, the concentration of said alkanolamine phosphate being from about 0.1 percent by weight up to the solubility limit of said phosphate in the solvent.

2. An electrolyte as claimed in claim 1, wherein the solvent is ethylene glycol, and the concentration of said alkanolamine phosphate is from about 0.1 percent by weight up to the solubility limit of said phosphate in ethylene glycol.

3. An electrolyte as claimed in claim 1, wherein the concentration of said phosphate is from about 0.1–6.0 percent by weight.

4. An electrolyte as claimed in claim 1, wherein the concentration of said phosphate is about 0.2 percent by weight.

5. An electrolyte as claimed in claim 4, wherein said ionogen is dimethylethanolamine adipate.

6. An electrolyte as claimed in claim 1, including a solvent compatible with ethylene glycol and with said phosphate.

7. An electrolyte, as claimed in claim 6, wherein said electrolyte composition contains, by weight, about:

| | |
|---|---|
| Ethylene glycol | 84.8% |
| Dimethylethanolamine adipate | 15.0% | and from 0.1 to 6.0 percent of said alkanolamine phosphate, said phosphate being at least one compound selected from the group TEAP and DEAP.

8. An electrolytic capacitor comprising a pair of electrodes, at least one of said electrodes being composed of a film-forming metal having a dielectric film thereon, and an electrolyte comprising a major proportion of a solvent, a minor proportion of an ionogen dissolved therein and an alkanolamine phosphate in said electrolyte, the concentration of said alkanolamine phosphate in said electrolyte being from about 0.1 percent by weight up to the solubility limit of said phosphate in said solvent.

9. An electrolytic capacitor as claimed in claim 8, wherein said solvent is ethylene glycol and the concentration of said phosphate in said electrolyte is from about 0.1 percent by weight up to the solubility limit of said phosphate in ethylene glycol.

10. An electrolytic capacitor as claimed in claim 8, wherein the concentration of said phosphate in said electrolyte is from

TABLE IV

| | Rated voltage at 85° C. | Capacitance (mf.) | Percent dissipation factor (D.F.) | Leakage current (ma. at rated voltage) |
|---|---|---|---|---|
| Initial 3,000 hrs. life | 5 | 240.2 | 115.4 | 0.85 |
| | 5 | 240.0 | 110.5 | 0.09 |
| Initial 2,000 hrs. life | 15 | 132.2 | 54.5 | 1.00 |
| | 15 | 122.0 | 55.6 | 0.40 |
| | 30 | 69.2 | 37.8 | 0.85 |
| Initial 3,000 hrs. life | 30 | 62.8 | 40.0 | 0.30 |
| | 75 | 23.7 | 22.3 | 0.75 |
| | 75 | 23.9 | 26.0 | 0.30 |
| Do | 150 | 97.2 | 14.3 | 0.35 |
| | 150 | 97.5 | 19.4 | 0.25 |

It is clear from table IV that the dissipation factor favors high voltage rated capacitors since it increases with decreasing rated voltage. On the other hand, the capacitance decreases with increased voltage rating. This is due to the increased thickness of the dielectric oxide film on the anode which is necessary to obtain the higher voltage rating. As is to be expected about 0.1–6.0 percent by weight.

11. An electrolyte capacitor as claimed in claim 8, wherein the concentration of said phosphate in said electrolyte is 0.2 percent by weight.

12. An electrolytic as claimed in claim 11, wherein said ionogen is dimethylethanolamine adipate.

13. An electrolytic capacitor as claimed in claim 8, wherein said electrolyte includes a solvent compatible with ethylene glycol and with said phosphate.

14. An electrolytic capacitor as claimed in claim 13, wherein said electrolyte composition, by weight, essentially containing approximately:

| | |
|---|---|
| Ethylene glycol | 84.8% |
| Dimethylethanolamine adipate | 15.0% | and from 0.1 percent to 6.0 percent of said alkanolamine phosphate, said phosphate being at least one compound selected from the group: Triethanolamine phosphate and diethanolamine phosphate.

15. An electrolyte as set forth in claim 1, wherein said electrolyte contains essentially dimethylethanolamine adipate and from 0.1 to 6.0 percent of triethanolamine phosphate (TEAP) in an aqueous environment so as to inhibit hydrogen gas formation by electrolysis of water.

16. An electrolyte as set forth in claim 1, wherein said electrolyte contains essentially dimethylethanolamine phosphate (DEAP) in an aqueous environment so as to inhibit hydrogen gas formation by electrolysis of water.

UNITED STATES PATENT OFFICE
CERTIFICATE OF CORRECTION

Patent No. 3,609,467                    Dated September 28, 1971

Inventor(s) James H. Curtis

It is certified that error appears in the above-identified patent and that said Letters Patent are hereby corrected as shown below:

Claim 11, line 1 "electrolyte" should read "electrolytic".

Claim 12, line 1 the word "capacitor" was omitted after "electrolytic".

Signed and sealed this 18th day of April 1972.

(SEAL)
Attest:

EDWARD M. FLETCHER, JR.                ROBERT GOTTSCHALK
Attesting Officer                      Commissioner of Patents